(12) United States Patent
Flowe

(10) Patent No.: US 8,574,342 B1
(45) Date of Patent: Nov. 5, 2013

(54) METHOD AND APPARATUS FOR MEMBRANE SEPARATION

(76) Inventor: Charles M. Flowe, Orange Beach, AL (US)

( * ) Notice: Subject to any disclaimer, the term of this patent is extended or adjusted under 35 U.S.C. 154(b) by 333 days.

(21) Appl. No.: 13/065,320

(22) Filed: Mar. 21, 2011

Related U.S. Application Data

(60) Provisional application No. 61/460,147, filed on Dec. 27, 2010.

(51) Int. Cl.
*B01D 53/22* (2006.01)

(52) U.S. Cl.
USPC .................. 95/14; 95/1; 95/15; 95/22; 95/45; 95/47; 95/52; 95/54; 96/4; 96/8; 96/10; 96/420; 96/421

(58) Field of Classification Search
USPC ............... 95/1, 14, 15, 19, 22, 45, 47, 52, 54; 96/4, 8, 10, 420, 421
See application file for complete search history.

(56) References Cited

U.S. PATENT DOCUMENTS

| | | | |
|---|---|---|---|
| 4,787,919 A | 11/1988 | Campbell et al. | |
| 5,290,341 A | 3/1994 | Barbe | |
| 5,388,413 A * | 2/1995 | Major et al. | 95/54 |
| 5,393,328 A | 2/1995 | Barbe | |
| 5,649,995 A * | 7/1997 | Gast, Jr. | 95/54 |
| 5,733,435 A * | 3/1998 | Prasad et al. | 95/54 |
| 5,785,739 A * | 7/1998 | Baker | 95/45 |
| 5,829,272 A | 11/1998 | Barry | |
| 5,837,032 A * | 11/1998 | Moll et al. | 95/54 |
| 5,840,098 A | 11/1998 | Barbe et al. | |
| 5,989,312 A * | 11/1999 | Barnhard et al. | 95/54 |
| 6,616,735 B1 * | 9/2003 | Burban et al. | 95/52 |
| 7,815,711 B2 | 10/2010 | Van Hove | |
| 2007/0034080 A1 * | 2/2007 | Van Hove | 95/45 |
| 2009/0249948 A1 | 10/2009 | Jeffers | |

\* cited by examiner

*Primary Examiner* — Jason M Greene
(74) *Attorney, Agent, or Firm* — George L Williamson

(57) ABSTRACT

Method and apparatus for a membrane separation system, including process and installation for the separation of air by permeation, using two strategically placed heaters for the production of high purity nitrogen, uniquely designed multi-staged pre-filtration system and a novel method of controlling the nitrogen flow and purity. The system comprises in series an air compressor (1), an air cooler (2) cooled by air or liquid, moisture separator (3), mist removing filter (4), primary heat source (5), coalescing filter (8), carbon tower (9), particle filter (10), secondary heat source (11), membrane separator (s) (14), and control valve (19). The system is to provide and maintain superheated air to the membrane separator(s) using strategically located heaters to eliminate condensation of moisture in the carbon tower or membrane separator(s) eliminating the need for a separate compressed air dryer, or the need for insulation of pipes, vessels and the membrane separator(s). This method allows simple process controllers to auto tune and maintain accurate temperature control under a variety of ambient temperature and turndown conditions.

14 Claims, 1 Drawing Sheet

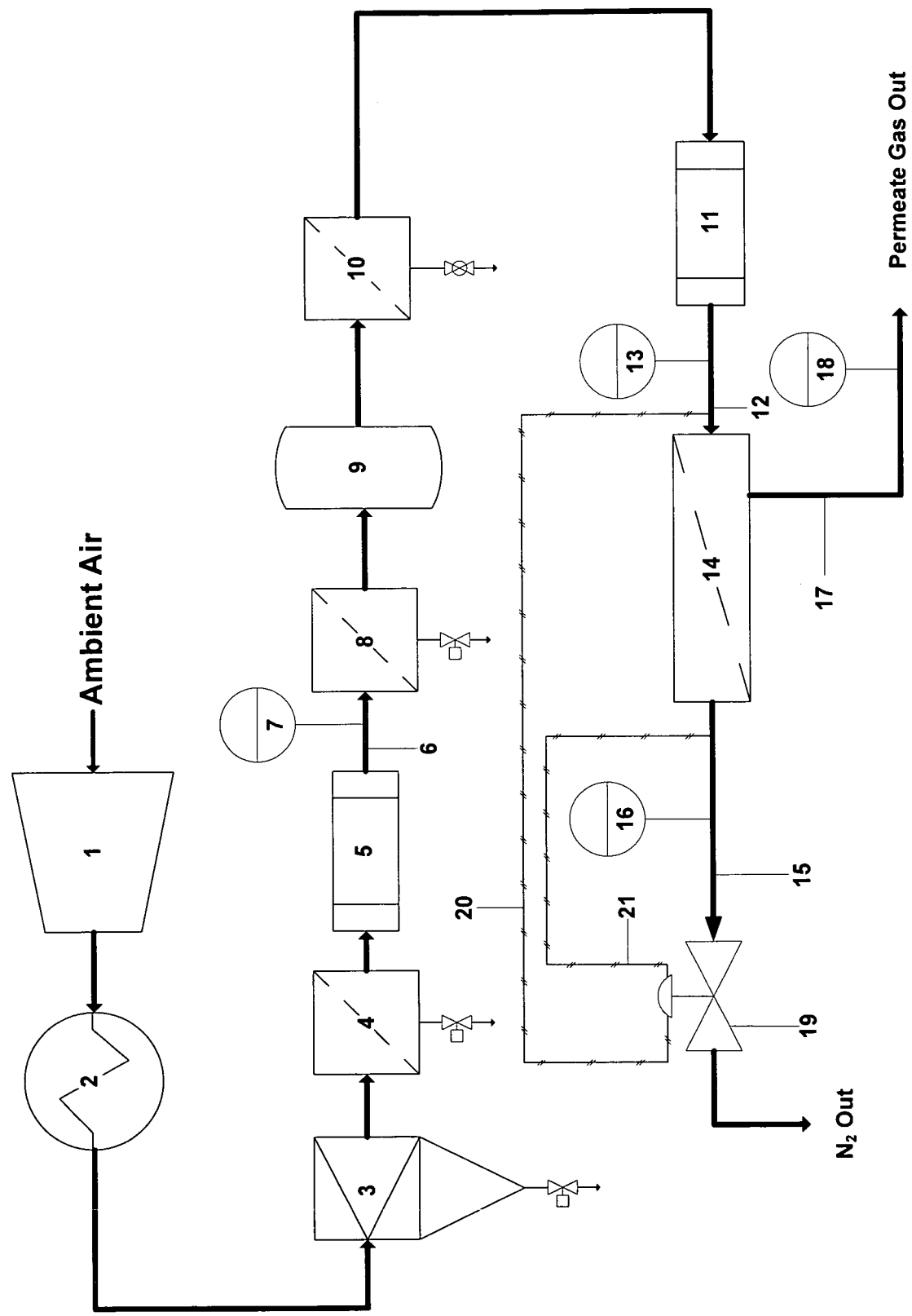

METHOD AND APPARATUS FOR MEMBRANE SEPARATION

RELATED APPLICATIONS

This application claims benefit of U.S. Provisional Patent Application having Ser. No. 61/460,147 filed on Dec. 27, 2010.

BACKGROUND OF THE INVENTION

1. Field of the Invention

The present invention relates to a method and apparatus for a permeable membrane gas separation system. More particularly, it relates to the prevention of condensation in such systems and method of protecting the membranes for longevity and control of gas purity. Longevity depends on the cleanliness of the feed air. The typical filtration system found in competitive systems often only meet the minimum requirements from the membrane manufacturers. This leads to premature aging of the membranes and a shortening of their useful life. The feed air purification system in the present invention is designed to provide air quality better than ordinary ambient air and better than systems designed for breathing air. The result is an extended useful life of the membrane separator(s).

2. Description of the Prior Art

The use of polymeric fiber membranes have been used for many years for the production of nitrogen gas from ordinary compressed air. In addition, whereas the addition of heat is not a requirement for the membrane to operate, there has always been the risk of airborne contaminants reaching the membrane fibers causing either a temporary or permanent reduction of capacity or total failure of the membrane. One of the causes widely known in the nitrogen generation industry is that of water vapor condensing in the air purification train, especially in the carbon tower and in the membrane separator due to ambient conditions which allow the moisture in compressed air to condense. Various methods are and have been in use to eliminate this problem. One such method is to use a separate compressed air dryer, either refrigerant type or regenerative adsorbent type to remove a significant amount of water prior to entry into the feed air purification train, or pre-filtration for a better description. The use of air heaters to superheat the air and lowering relative humidity is not new to the nitrogen generation industry. The air heater, in addition to lowering relative humidity and carrying any remaining moisture in the vapor state to the membrane, is a common practice in the industry. The heated air also causes the membrane to perform in a predictable manner and flow of nitrogen at a given oxygen content increases directly with an increase in temperature or decrease in temperature. So pre-heating the feed air to the membrane serves two basic purposes. First is to keep moisture from condensing in the air purification train or process stream, especially in the carbon bed and membrane and secondly, to provide for a stable production of nitrogen under various ambient temperature conditions. The source of heat for this purpose traditionally has been from electric heaters, steam heat exchangers, air-to-air and air-to-oil heat exchangers using heat of compression as the heat source to provide a cost effective means to provide such heat to the membrane. Some prior methods require insulation of membranes and/or housing the membranes in a separated heated enclosure, whereas some other methods require insulation of the piping and components of the air purification system and most require insulating the membranes, which is expensive and makes servicing the system's components difficult. Although these prior methods have their merits, in practice they can be quite expensive and intrusive and in some cases detrimental to the operation and reliability of the air compressor. In prior methods, a single heater or heat exchanger has been utilized for the entire BTU required.

The practice of using moisture separators, coalescing filters, carbon towers, and particle filters to protect the membranes from solid particles, condensed water and oil, oil aerosol, oil vapor and other hydrocarbons present in the feed air stream from oil flooded air compressors is commonly used in the industry. Some systems use multi-staging of filters in their design, some use single coalescing filters and most systems size the filtration system to where the operating pressure loss across the pre-filtration system is quite significant. In the science of membrane separation it is common to all manufacturers of membranes that production of gas is directly related to pressure at the inlet to the membrane separators; The higher the air pressure, the more production (flow) at a given purity (percent of oxygen in product). Increasing the number of stages of filtration and lowering the operating pressure loss is desirable from a membrane protection standpoint, but size constraints, economics and other factors can be prohibitive. Multi-staging of filtration, by definition, means an increasing number of stages, whereby each stage is highly efficient at its design grade, but with rougher grades followed by finer grades where the resulting efficiency of the combination is greatly improved. While these existing pre-filtration systems are adequate, there is a definite need for a pre-filtration system that meets high performance of multi-staging AND does it with a minimum of filter housings and pressure loss, thereby allowing a higher inlet pressure to the membrane(s) which will allow for a higher flow rate of nitrogen at a given nitrogen purity.

Gas purity controls have ranged in designs to a simple manual valve, valves with back pressure regulator, differential pressure regulator measuring the differential across an orifice that operate a control valve, automated controls that use the output of oxygen from an oxygen analyzer to control a valve to match the oxygen set point. There are also valves that are self contained that will control the flow and purity, but have a high built in pressure drop across the valve. The problem with a manual valve is that under varying downstream pressure, the flow and resulting purity of the product cannot be maintained. A manual valve with a back pressure regulator has some degree of control of flow under fluctuating downstream pressure, but adjustment of the two valves can be complicated and the flow/purity accuracy is not very desirable. The differential pressure regulator, orifice and control valve combination works well in controlling the purity, but there are so many components, the system is both confusing and expensive. The automated controls using PID (proportional-integral-derivative) controls, oxygen analyzer analog output and control valve is a very expensive system with many components and takes a relatively long time to tune initially and on starting the machine, takes too long to reach the controlled purity and in some cases will oscillate due to upsets in the system. While these systems have proven adequate to one degree or another, a simpler solution to purity control is needed.

SUMMARY OF THE PRESENT INVENTION

The present invention discloses the use of two equally sized heaters, and their method of control, strategically placed in the membrane pre-treatment train to provide the necessary superheat to prevent condensation, and to provide the final desired average temperature inside the membrane separator (s) for optimum performance and protection. The present invention also provides six stages of filtration in five housings providing a highly efficient membrane pre-treatment system that are suited to moisture saturated air at the inlet of the pre-filtration system and do so with a low operating pressure drop. The present invention also provides a flow/purity control valve that gives accurate purity with large fluctuations in downstream pressure and is in a single assembly, at low cost, low pressure drop and with a single adjustment screw.

It is an object of the present invention to allow the use of standard oil free or oil lubricated compressors, without modification, eliminate the requirement of a separate compressed air dryer prior to the nitrogen generator's pre-filtration system, prevent condensation, be able to operate in a broad range of ambient temperatures and turndown conditions, without the need for insulation. Further, the present invention further simplifies the setup time, start-up time and simplified temperature adjustments. Further, the present invention uses unique filtration methods to provide an additional degree of protection by its unique combination and sizing of the individual pre-filtration components. Further, the present invention also includes a novel method of control of nitrogen purity.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which:

FIG. 1 is a schematic diagram of the embodiment of the temperature control, pre-filtration and purity control systems of the present invention.

LIST OF REFERENCE NUMERALS

With regard to reference numerals used, the following numbering is used throughout the drawings.

| | |
|---|---|
| 1 | air compressor |
| 2 | cooler |
| 3 | moisture separator |
| 4 | mist removing filter |
| 5 | primary heater |
| 6 | conduit |
| 7 | temperature sensor |
| 8 | coalescing filter |
| 9 | carbon tower |
| 10 | two-stage particle filter |
| 11 | secondary heater |
| 12 | membrane inlet conduit |
| 13 | inlet temperature sensor |
| 14 | membrane separators |
| 15 | membrane outlet conduit |
| 16 | outlet temperature sensor |
| 17 | conduit |
| 18 | permeate temperature sensor |

-continued

| | |
|---|---|
| 19 | control valve |
| 20 | sensing line |
| 21 | sensing line |

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. FIG. 1 illustrates the present invention wherein a method and apparatus for membrane separation is disclosed.

Turning to FIG. 1, therein is shown the present invention showing ambient air being inlet as indicated by the direction arrow. Compressed air is supplied by an air compressor (1), either oil lubricated or oil free type. To remove the heat of compression and remove a portion of the moisture carried in the compressed air, a cooler (2), either air-to-air or air-to-liquid type is installed. In most air compressors (1) this cooler (2) is an integral part of the air compressor package. The condensed liquid is captured and drained.

Super saturated compressed air enters the gas separation system at this point. Super saturation means that in ambient temperatures that are colder than the saturated dew point of the compressed air inside the conduit, condensation will occur. This condensation is collected in a high efficiency moisture separator (3) and drained.

The compressed air continues through the process stream, i.e., conduit, to the mist removing filter (4). The mist remover is a moderately high efficiency filter with an extremely low pressure drop and is designed for direct contact with condensed water, solid particles and oil aerosol. The compressed air is still in the super saturated state and will continue to condense in colder ambient due to the heat sink of the filter housing. Condensation along with collected oil and water is drained. Coalescing filters typically used in membrane gas separation systems are not particularly effective in removing moisture in the liquid state and this liquid moisture interferes with their coalescing efficiency. The mist removing media used is in the present invention is unaffected by condensate and is an improvement over the use of coalescing filters currently used in other systems of this type.

The compressed air is then delivered to the primary heater (5) where it is superheated, thereby lowering the relative humidity of the compressed air. Generally a minimum of 3° C. superheat is required under stable temperature conditions to maintain the moisture in the vapor state to the membrane separators (14). However, due to the possibility of extremely cold ambient temperatures, the heater is sized for one half the total BTU required to reach the final optimal temperature required at the membrane separator (14) regardless of ambient temperature based on the coldest ambient expected for the particular machine. The control for this heater is through a simple process controller (not shown) using PID (proportional, integral, and derivative) along with a temperature sensor (7) located in conduit (6). By using this method of control, the process controller will auto tune and provide a near constant delivery temperature from the heater and can be set up by unskilled labor. While there are heat sinks in the system, the present invention gets the membranes to their targeted stable temperature faster than previous methods. The components and piping of the membrane pre-filtration system are heat sinks and with the present invention will come up to their stabilized temperature without delaying the production of nitrogen. The set point for the primary process controller would be set at the desired operating temperature at the membrane separator (14) thereby obtaining the maximum superheat under all ambient conditions where the system would be applied.

The superheated compressed air will flow into a high efficiency coalescing filter (8) where only trace amounts of oil aerosol and submicronic particles are being removed by the filter element. In addition to dramatically improving the coalescing and solid particle removing efficiency of the filtration system, this secondary coalescing filter (8) provides a backup for the first filter in the possible case that the mist removing filter (4) would be defective or fail for some reason. By multi-staging these two filters with a lower efficiency filter followed by a higher efficiency filter, the dust particles that cause a filter element to rise above the wet element pressure drop shows only a minor rise in pressure drop after one year's service. Wet element pressure drop being defined as the pressure loss across the element once the element has reached its saturation point at its operating conditions of flow, pressure and temperature. In a typical one year element replacement schedule, the primary mist removing element (4) will reach its saturation point and continue coalescing and draining out through the housing sump and drain, however the secondary coalescing filter (8) element under normal continuous operation rarely ever reaches its saturation point. This is partially achieved through filter media type, grade and finally through conservative sizing of the filtration system and connecting piping or conduit.

The air is then free from oil aerosols down to less than 1 part per billion by weight. The virtually oil free air enters the carbon tower (9) where the activated carbon pellets only have to remove the remaining oil aerosol and the oil vapor and other hydrocarbon vapors contained in the compressed air stream, either from the lubricating oil and its additives and/or certain hydrocarbon vapors which may be introduced into the intake of the air compressor (1). The carbon bed is so designed as to not get oil vapor breakthrough in a full year under normal operating conditions and assuming a properly maintained compressor and pre-filter elements are changed at their proper intervals. Screens are used to keep the carbon pellets in the tower, but a certain amount of dusting will go downstream, which can be harmful to the membrane separators (14).

To prevent carbon dust carryover from getting to the membrane separators (14) a 2-stage particle filter (10) in a single housing is used to successfully remove the carbon dust from the compressed air stream. The inner layer is a pleated cellulose filter with an absolute rating for particles 3 microns and larger and the outer layer is has an efficiency of greater than 99.999% at 0.01 micron. These two stages together have a higher efficiency than each individually and due to the variety of particle sizes reaching the filter, the bulk of the carbon dust will be collected in the inner layer, leaving only the smaller particles to reach the more efficient outer layer. The end result is a filter that does not noticeably build pressure drop during the element's service interval, partially due to the dual stage and filter grade combination and partly by conservative filter and conduit sizing.

Following the 2-stage particle filter (10) is the secondary heater (11), that is a trim heater maintaining the desired set point temperature for the membrane separators (14) by taking an average of the inlet temperature sensor (13) located in conduit (12), outlet temperature sensor (16) in conduit (15), and permeate temperature sensor (18) located in conduit (17). These three sensors are input into a PLC (programmable logic controller) and averaged. The average temperature is output as the process variable into a simple process controller with a PID control that will auto tune and not require a PID specialist to tune the control, but rather an unskilled worker can easily perform the setup. Logic is also provided in the PLC from allowing the temperature at the membrane inlet, more specifically in conduit (15) from exceeding the membrane manufacturer's recommended maximum inlet temperature during cold startup. This primary and secondary heater design provides for an easier setup, faster start-up without the need for insulation of the main compressed air piping, filtration system components, or the membrane separators. This provides the fastest method of getting the membrane separators (14) up to their specified stabilized temperature than any other method and prevents the problem of moisture condensing in the membrane housing. If there were a component failure in the secondary heater (11) or its control system, the primary heater (5) would allow the gas generation system to operate at approximately 80% of its rated production capacity, while provisions for repair were underway. Since the primary heater (5) is vital to the prevention of moisture condensation in the components downstream of that heater, any failure of the heater or its control components would necessitate a complete system shutdown. Logic is provided for this shutdown in the PLC. The temperature range of operation will vary from system to system, based on location, ambient temperatures, available-compressed air capacity, membrane efficiency, air pressure, altitude, required nitrogen purity (remaining oxygen content in the product stream), and aging (from contamination or from natural aging or stiffening of the membrane fibers, which both reduce the capacity and selectivity of the fibers) of the membrane(s). Depending on these conditions, the heater sizes and other component selection would be changed to meet these conditions using compressed air and gas best engineering practices. In general, however, the units would be able to be located in any location in the world, at any altitude, or at any ambient temperature and not change the design, only component selection and possible modifications to the ventilation in high ambient, and freeze protection in low ambient. In general, the units could operate in ambient from −40° F. to +130° F. (Fahrenheit) as dictated by application specific requirements. The heated air temperatures would normally range from 40° F. to as high as 180° F., depending upon the application requirements and the membrane manufacturer's temperature limits. Regarding the system pressure ranges, although membrane separators will function at low pressure, they are more effective at higher pressures. Pressure ranges at the inlet to the membrane separators from 15 psiG to 450 psiG (pounds per square inch gauge) are possible depending on membrane selection and application requirements, but nominal range is from 100-200 psiG.

The flow/purity control valve (19) is novel in that it is a combination of standard components of a particular valve manufacturer combined into a single valve at our request for this particular use. Whereas formerly to get the action and performance needed many components were required, as well as a great deal of space was required and the resultant economic impact was simplified with this new valve is completely self contained into one part with a single screw flow adjustment. The valve consists of a control valve with a differential pressure regulator mounted directly on the valve operator. The differential pressure regulator measures and controls the differential pressure from taps in membrane inlet conduit (12) through sensing line (20) and membrane outlet conduit (15) through sensing line (21). A higher differential pressure indicates a higher flow rate with higher oxygen content (lower purity) in the nitrogen product gas where a lower differential pressure indicates a lower flow rate with a lower oxygen content (higher purity). Precise nitrogen flow and purity are easily adjusted with the turn of a single spring loaded screw. With temperature and pressure steady at the inlet to this valve, gas flow (and resultant purity) is maintained constant even when downstream pressure fluctuates as in a batch process where a nitrogen storage tank (optional and not shown) has rapid changes in pressure. This valve will maintain a steady flow under all flow dynamics from zero gauge pressure to close to valve inlet pressure. This degree of control accuracy is not achievable with other types of controls previously mentioned in prior art section of this application. The automated systems have to re-tune themselves causing a large proportional band width and resulting erratic flow and purity fluctuations until the PID loop can settle. A simple manual valve alone will not maintain flow or gas purity except with steady upstream and downstream pressures. A manual valve with a back pressure regulator has a certain degree of flow and purity accuracy, but not nearly as well as the novel art in this application, plus it is difficult to adjust because both the manual and back pressure valves have to be adjusted.

As used in this application, the term "trim heater" is defined as a secondary heater that makes up the difference in the total BTU required for the applicable system. Any time the ambient temperature or the actual process temperature is lower than the targeted process temperature, the secondary heater will trim or maintain the target temperature. The term "superheat" is defined in this application as raising the process feed compressed air temperature to a point higher than the saturation point (dew point) of the process feed air, and sufficient to lower the relative humidity of the compressed air and thereby maintaining the moisture contained in the compressed air in the vapor state, eliminating condensation under all ambient conditions. The amount of superheat required will vary depending upon ambient conditions and application specific process temperature requirements.

I claim:

1. An apparatus for a permeable membrane gas separator, comprising:
    a) a compressor having an air stream inlet;
    b) a cooler connected to receive compressed air from said compressor for cooling the compressed air;
    c) a primary heater downstream of said cooler;
    d) a secondary heater downstream of said primary beater; and,
    e) a permeable membrane gas separator downstream of said secondary heater having a permeate outlet and a non-permeate outlet; and
    f) said secondary heater being controlled by averaging an output of first, second and third temperature sensors, wherein said first temperature sensor is disposed between said secondary heater and said permeable membrane gas separator, said second temperature sensor is disposed in said permeate outlet, and said third temperature sensor is disposed in said non-permeate outlet.

2. The apparatus of claim 1, wherein said primary heater provides about fifty percent of the total BTU required to reach final operating temperature at the permeable membrane gas separator.

3. The apparatus of claim 1, wherein said secondary heater is a trim heater.

4. The apparatus of claim 1, further comprising a filter disposed between said cooler and said primary heater for removing condensed moisture, oil aerosol and solid particles from the air stream.

5. The apparatus of claim 1, further comprising a coalescing filter disposed between said primary heater and said secondary heater for removing oil aerosol and solid particles from the air stream.

6. The apparatus of claim 1, further comprising a control valve disposed in said non-permeate outlet downstream of said permeable membrane gas separator.

7. The apparatus of claim 6, wherein said control valve further comprises a differential pressure regulator, wherein said differential pressure regulator measures the differential pressure between a first point, disposed between said secondary heater and said permeable membrane gas separator, and a second point, disposed between said permeable membrane gas separator and said control valve.

8. A method of gas separation comprising the steps of:
    a) compressing an ambient air stream;
    b) cooling the compressed air stream;
    c) heating the air stream using a primary heater disposed downstream of the cooler;
    d) heating the air stream using a secondary heater disposed downstream of the primary heater; and,
    e) providing a permeable membrane gas separator downstream of the secondary heater having a permeate outlet and a non-permeate outlet; and
    f) controlling the secondary heater by averaging the output of first, second and third temperature sensors wherein said first temperature sensor is disposed between said secondary heater and said permeable membrane gas separator, wherein said second temperature sensor is disposed in said permeate outlet, wherein said third temperature sensor is disposed in said non-permeate outlets.

9. The method of claim 8, wherein the secondary heater is a trim heater.

10. The method of claim 8, further comprising the step of providing a filter disposed between the cooler and the primary heater for removing condensed moisture, oil aerosol and solid particles from the air stream.

11. The method of claim 8, further comprising the step of providing a coalescing filter disposed between primary heater and the secondary heater for removing oil aerosol and solid particles from the air stream.

12. The method of claim 8, further comprising the steps of providing a control valve disposed in the non-permeate outlet downstream of the permeable membrane gas separator.

13. The method of claim 12, wherein the control valve further comprises a differential pressure regulator, wherein the differential pressure regulator measures the differential pressure between a first point and a second point, wherein the first point is disposed between the secondary heater and the permeable membrane gas separator, and the second point is disposed between the permeable membrane gas separator and the control valve, wherein the differential pressure regulator controls the differential pressure between the first point and the second point.

14. Apparatus for the production of nitrogen gas from compressed air, comprising:
    a) a compressor for compressing ambient air;
    b) a cooler connected to receive compressed air from said compressor for cooling the compressed air;
    a primary beater downstream of said cooler;
    d) a secondary heater downstream of said primary heater;

e) a permeable membrane gas separator downstream of said secondary heater for separating out the nitrogen in the compressed air; and f) a programmable logic controller for controlling said secondary heater by averaging an output of first, second and third temperature sensors disposed respectively between said secondary heater and said permeable membrane gas separator, and in permeate and non-permeate outlets of said permeable membrane gas separator to maintain a desired set point temperature for said permeable membrane gas separator.

\* \* \* \* \*